United States Patent

Shahana

[11] Patent Number: 5,829,313
[45] Date of Patent: Nov. 3, 1998

[54] BICYCLE DERAILLEUR SHIFTING MECHANISM HAVING INDEXING CONFIGURED FOR USE WITH VARIETY OF CHAIN SPROCKET SETS

[75] Inventor: Satoshi Shahana, Osaka, Japan

[73] Assignee: Shimano Inc., Osaka, Japan

[21] Appl. No.: 782,233

[22] Filed: Jan. 13, 1997

[51] Int. Cl.$^6$ .......................... G05G 11/00; B60K 20/06
[52] U.S. Cl. .................... 74/502.2; 74/489; 74/575; 74/577 M; 74/473.14
[58] Field of Search ................... 74/502.2, 489, 74/575, 577 R, 577 M, 142, 473.13, 473.14

[56] References Cited

U.S. PATENT DOCUMENTS

| | | | |
|---|---|---|---|
| 3,107,544 | 10/1963 | Nichols et al. | 74/142 X |
| 3,120,131 | 2/1964 | Simonds | 74/142 X |
| 3,124,965 | 3/1964 | Sammarco | 74/142 X |
| 3,138,030 | 6/1964 | Godel | 74/575 X |
| 3,142,188 | 7/1964 | Miller | 74/142 X |
| 4,117,743 | 10/1978 | Suzuki et al. | 74/577 M |
| 4,864,885 | 9/1989 | Nagano | 74/502.2 |
| 5,052,241 | 10/1991 | Nagano . | |
| 5,203,213 | 4/1993 | Nagano . | |
| 5,213,005 | 5/1993 | Nagano | 74/502.2 |
| 5,307,706 | 5/1994 | Nagano | 74/502.2 |
| 5,361,645 | 11/1994 | Feng et al. . | |
| 5,564,310 | 10/1996 | Kishimoto . | |
| 5,730,030 | 3/1998 | Masui | 74/502.2 X |

*Primary Examiner*—Charles A. Marmor
*Assistant Examiner*—Scott Lund
*Attorney, Agent, or Firm*—Shinjyu An Intellectual Property Firm

[57] ABSTRACT

An apparatus for operating a bicycle transmission shifting device having an operating component for mounting to a bicycle in close proximity to a brake operating unit for alternately pulling and releasing a transmission element, a first lever is mounted to the operating component for movement which causes the operating component to pull the transmission element and second lever is mounted to the operating component for movement which cause the operating component to release the transmission element. The first lever and the second lever are mounted to the operating component so that the brake operating unit is disposed between the first lever and the second lever when the shifting device is mounted to the bicycle. In order to be able to construct the shifting device with only a single pawl for the release mechanism the takeup element for the transmission element includes a control member having a plurality of large and small position retaining teeth for engaging the single release pawl.

3 Claims, 13 Drawing Sheets

BICYCLE DERAILLEUR SHIFTING MECHANISM HAVING INDEXING CONFIGURED FOR USE WITH VARIETY OF CHAIN SPROCKET SETS

BACKGROUND OF THE INVENTION

1. Field of the Invention

The present invention is directed to a front gear derailleur shifting mechanism for bicycles and, more particularly, to a shifting mechanism which includes indexing for accurate derailleur movement with respect to sprockets of a corresponding sprocket set.

2. Description of the Related Art

Bicycles, for instance racing bicycles and mountain bicycles, often include both front and rear chain derailleur mechanism having corresponding handlebar mounted shifting mechanisms. The shifting mechanism effects positional changes of the chain derailleur mechanism by controlling movement of a cable connected therebetween. Recently, such shifting mechanisms have included indexing devices which cause the positional changes to be accurately controlled to put the chain derailleur into generally consistent predetermined positions with respect to chain sprockets in a corresponding sprocket set.

Most rear chain derailleur mechanisms, shifting mechanisms and the corresponding chain sprockets are designed, sold and installed on a bicycle as a matched set where the indexing device in the shifting mechanism is configured to selectively position the chain derailleur in approximate alignment with each chain sprocket of the corresponding sprocket set. However, front chain derailleurs are often not installed on a bicycle as a set with a corresponding set of chain sprockets, but rather the front gear derailleur and shifting mechanism may be used with a sprocket set whose sprockets that have dimensions different from those the shifting mechanism's indexing was designed to function with. Consequently, the indexing of the shifting mechanism may cause the chain derailleur to move to a position that is not in acceptable alignment with one of the sprockets of the sprocket set, thus causing the chain to scrape the derailleur, or worse, may not allow the chain to properly engage the one of the sprockets in the sprocket set.

A known indexed shifting apparatus for bicycles is disclosed in U.S. Pat. No. 5,203,213. As shown in FIGS. 3 and 4 of that patent, this type of shifting device includes a support shaft (11) fixed to a bracket (B) mounted on a handlebar; a takeup reel (2) rotatably mounted on the support shaft (11) for alternately pulling and releasing a control cable (I) a first control lever (4) pivotable about the support shaft (11) for causing the takeup reel (2) to pull the control cable (I); and a second control lever (7) for causing the takeup reel (2) release the control cable (I). The first control lever (4) engages feed teeth (21) on takeup reel (2) through a feed pawl (41) to cause the takeup reel (2) to rotate in the cable pulling direction. The second control lever (7) engages two sets of position retaining teeth (31,61) takeup reel (2) through two pawls (32,62) to cause the takeup reel to rotate in the cable release direction. The first control lever (4) and the second control lever (7) are both mounted at a position below the handlebar for operation by the index finger and thumb of a cyclist's hand.

The above described bicycle shifting mechanism is configured for shifting between five or more chain sprockets in a sprocket set and is typically used with the rear derailleur of a bicycle. However, with minor modification, for instance, fewer position retaining teeth, the shifting apparatus may be used with a front gear derailleur. Front gear derailleurs are typically used with a sprocket set having only two or three sprockets, thus necessitating reducing the number of position retaining teeth in the shifting mechanism. However, there remains the problem of accurately positioning the derailleur with sprockets in a sprocket set whose positioning requirements differ from the configuration of the indexing of the shifting mechanism.

SUMMARY OF THE INVENTION

One object of the present invention is to provide a shifting mechanism that may be used with multiple types of sprockets sets, each sprocket set having dimensions differing from other sprocket sets.

In accordance with one aspect of the present invention, a shifting mechanism is configured for selectively moving a chain derailleur between a plurality of positions corresponding to positions of sprockets of plurality of differing sprocket sets. The shifting mechanism includes a control member mounted for selective rotational movement within the shifting mechanism structure. The control member is formed with a plurality large position retaining teeth and a plurality of small position retaining teeth, at least one of the small position retaining teeth formed between each adjacent ones of the large position retaining teeth. Each of the large position retaining teeth is positioned on the control member to correspond to the positions of the sprockets in a first of the plurality of differing sprocket sets, and at least one of the small position retaining teeth corresponds to the position of one sprocket in a second of the plurality of differing sprocket sets.

These and other objects, features, aspects and advantages of the present invention will become more fully apparent from the following detailed description of the present invention when taken in conjunction with the accompanying drawings where like reference numerals denote corresponding parts throughout.

BRIEF DESCRIPTION OF THE DRAWINGS

FIGS. 5A–5F are views illustrating two differing sprockets sets, one sprocket set shown in the upper portion of each FIGS. 5A–5F and another sprocket set shown in the lower portion of each of FIGS. 5A–5F, the position of a chain derailleur is shown in each of FIGS. 5A–5F with respect to the two sprocket sets, the position of the derailleur in FIG. 5A corresponding to the position of the control member depicted in FIG. 4A, the position of the derailleur in FIG. 5B corresponding to the position of the control member depicted in FIG. 4C, the position of the derailleur in FIG. 5C corresponding to the position of the control member depicted in FIG. 4D, the position of the derailleur in FIG. 5D corresponding to the position of the control member depicted in FIG. 4E, the position of the derailleur in FIG. 5E corresponding to the position of the control member depicted in FIG. 4F, and the position of the derailleur in FIG. 5F corresponding to the position of the control member depicted in FIG. 4G;

DETAILED DESCRIPTION OF THE EMBODIMENTS

Figure 1:
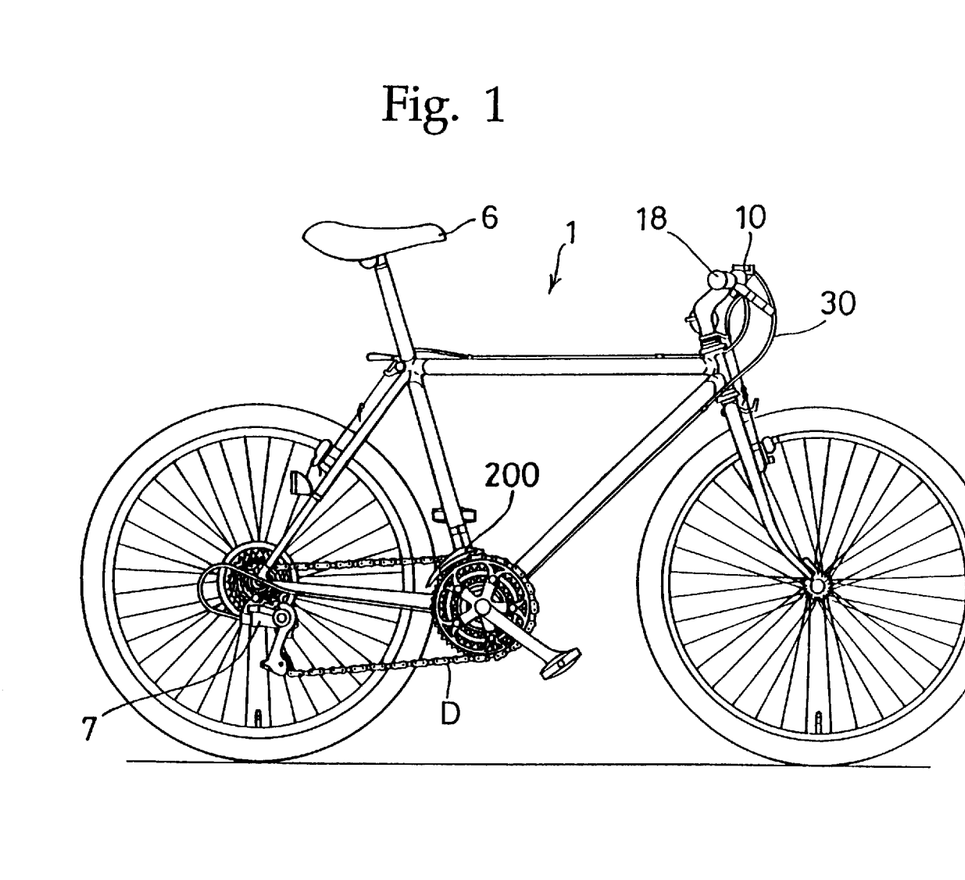
FIG. 1 is a side elevational view of a bicycle having a handlebar and a seat, the bicycle being equipped with a bicycle shifting apparatus in accordance with the present invention.
Figure 2:
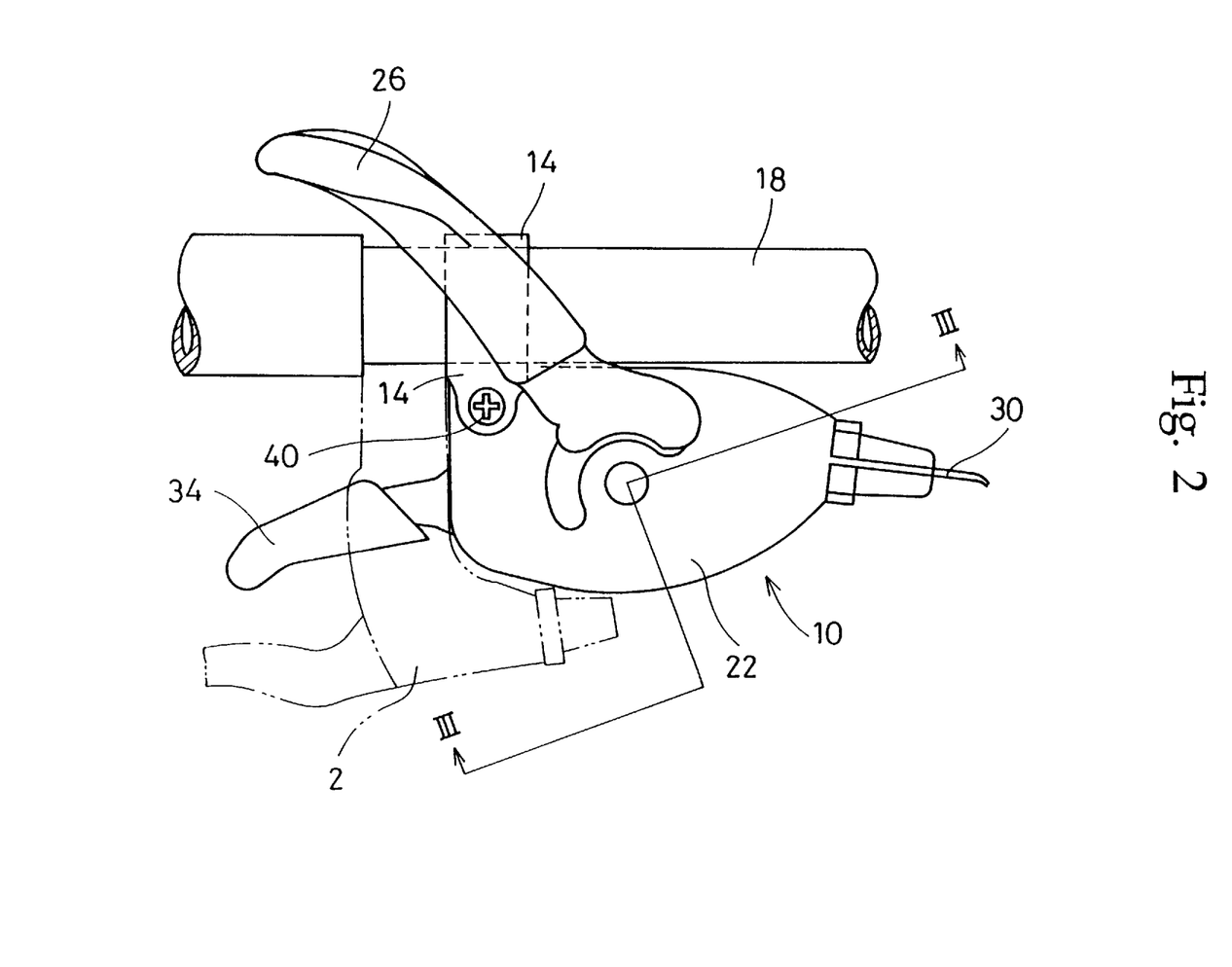
FIG. 2 is a fragmentary, elevational view of the shifting apparatus attached to the handlebar of the bicycle depicted in FIG. 1, looking from the seat toward the handlebar.
Figure 3:
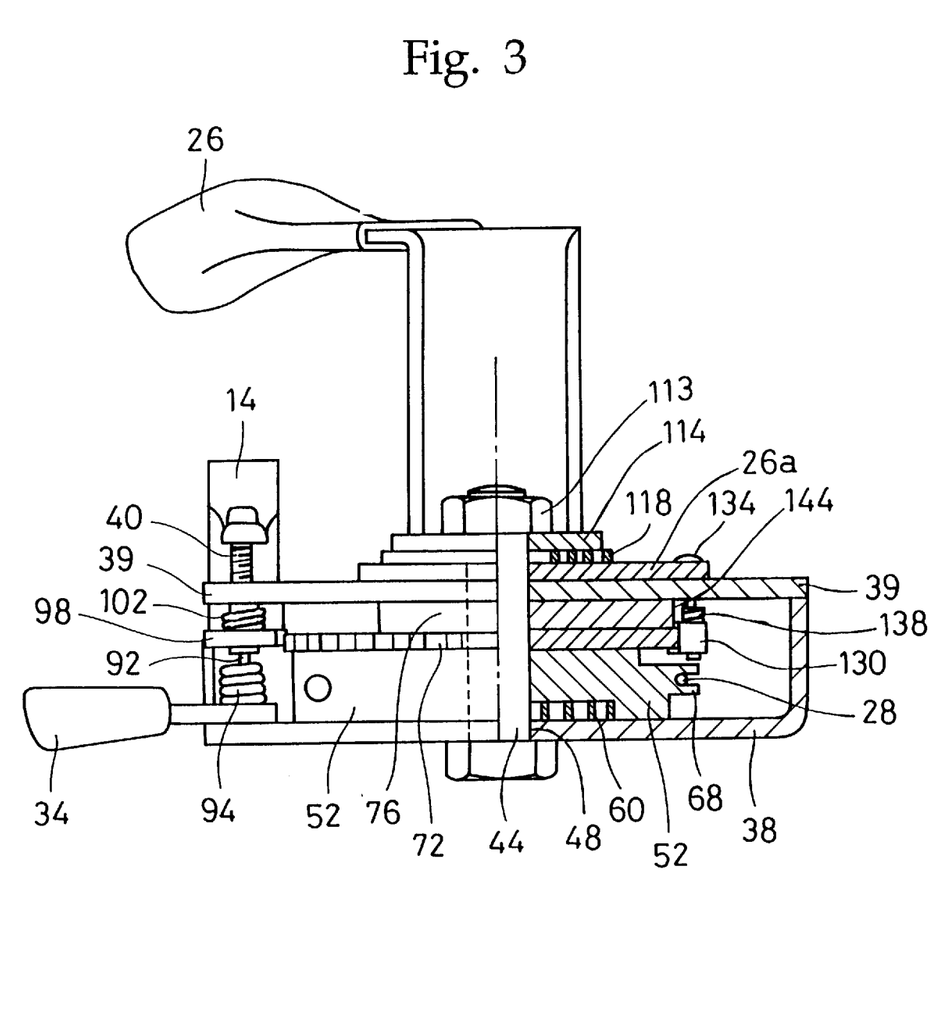
FIG. 3 is a part elevational view, part cross-sectional view of the shifting apparatus depicted in FIG. 2, shown removed from the handlebar, taken along the line III—III of FIG. 2, the shifting apparatus having a control member, a release pawl and a drive pawl.

FIG. 1 is a side view of a bicycle (1) in accordance with the present invention having a handlebar (18), a front derailleur (200) and a rear derailleur (7) and a seat (6). To control the position of the derailleur (200), a shifting apparatus (10) is installed on the handlebar (18). The detailed structure of shifting apparatus (10) is shown in FIGS. 2 and 3. The shifting apparatus (10) includes a mounting bracket (14) for mounting the shifting apparatus (10) to a handlebar (18). However, it should be appreciated that the shifting apparatus could be mounted elsewhere on the bicycle. As shown in FIG. 2, the shifting apparatus (10) is configured to be mounted adjacent to a brake lever, the brake lever shown in dashed lines in FIG. 2. The shifting apparatus (10) also includes: a housing cover (22) which houses the shifting components; a main lever (26) for causing the shifting apparatus (10) to pull on an inner wire (28) (see FIG. 3) of a shifting cable (30); and a release lever (34) for causing the shifting apparatus to release the inner wire (28). Due to the proximity to the brake lever shown in FIG. 2, the shifting apparatus (10 is operated using two fingers. The bicycle rider may use a thumb to depress the main lever (26) and a forefinger to pull upward on the release lever (34), with respect to FIG. 2. In FIG. 3, the housing cover (22) has been removed for greater clarity.

A support from (38) is formed with bracket (14) which secures the shifting apparatus (10) to the handlebar (18). The bracket (14) is adapted to be fastened to handlebar (18) by a mounting screw (40). A main pivot post (44) extends through an opening (48) in the support frame (38). A takeup element (52) is rotatably mounted to main pivot post (44) and is biased in a cable unwinding direction by a spring (60). A cable retainer (not shown) is fastened to the end of inner cable (28) and is retained by the takeup element (52) in a well known manner. Inner cable (28) is guided within a cable winding groove (68) during the shifting operation. A control member (72) is fixed to takeup element (52) so as to rotate integrally with it. As described in more detail below, control member (72) includes a plurality of large position retaining teeth (80a, 80b and 80c), a plurality of small positioning teeth (82a, 82b, 82c, 82d, 82e and 82f) and plurality of drive teeth (84) shown in FIGS. 4A–4I, for rotating and controlling the position of takeup element (52) in conjunction with main lever (26) and release lever (34).

Release lever (34) is rotatably mounted to a release pivot post (92) which, in turn, is mounted to the support frame (38) and a cover (39) attached to the support frame (38). A spring (94) mounted between release lever (34) and release pivot post (92) for biasing release lever (34) to a home position (as shown in FIG. 2). A release pawl (98) is also rotatably mounted to the release pivot post (92) and is biased in a clockwise direction (with respect to FIGS. 4A through 4I) by a release pawl spring (102). Release pawl (98) shown in FIGS. 4A–4I includes spaced apart jaws (104,106) for engaging the large and small position retaining teeth (80a–80c) and (82a–82f) on control member (72) in a manner discussed below. A release lever tab (not shown) on release lever (34) contacts a portion of release pawl (98) to pivot release the pawl with counterclockwise movement (with respect to FIGS. 4A–4I) of release lever (34). Details concerning the release lever tab (not shown) are similar to the operation and configuration of the shifting mechanism described in co-pending and commonly assigned U.S. patent application Ser. No. 08/588,659, filed Jan. 19, 1996. The entire contents of U.S. patent application Ser. No. 08/588,659, filed Jan. 19, 1996 are incorporated herein by reference.

Main lever (26) is rotatably mounted to main pivot post (44) by a retainer nut (113). The post (44) and the nut (113) retain a spacer (114) on the post (44) such that the spacer (114) cannot rotate with respect to the cover (38) and the post (44). For instance, the post (44) is formed with an axially extending slot (not shown) and the spacer (114) is formed with a tab (not shown) which extends into the unillustrated slot in a manner well known to prevent rotation of the spacer (114). A spring (118) is retained between the spacer (114) and a base portion (26a) of the main lever (26). The base portion (26a) has a generally disk-like shape and is integrally formed with the main lever (26). One end (not shown) of the spring (118) engages the spacer (114) and another end (not shown) of the spring (118) engages the base portion (26a) for biasing main lever (26) to a home position (as shown) in FIG. 2). A retainer plate (76) is held in place by the post (44) between the cover (39) and the control member (72), as shown in FIG. 3, such that the retainer plate (76) cannot rotate with respect to the cover (39). It should be understood that the control member (72) and the takeup element (52) are fixed to one another but are rotatable about the post (44) and are rotatable with respect to the cover (39), but the takeup element (52) is biased by the spring (60) in a counterclockwise direction (with respect to FIGS. 4A–4I). A drive pawl (130) is mounted to a drive pivot post (134). The drive pivot post (134) extends through an arcuate slot (not shown) formed the cover (39). The drive pivot post (134) is further fixed to the base portion (26a) such that as the lever (26) is moved, the post (134) moves within the confines of the slot (not shown) in the cover (39). The drive pawl (130) is mounted on the post (134) but may rotate with respect to the post (134). The drive pawl (130) is biased in a clockwise direction (with respect to FIGS. 4a–4I) by a spring (138), and both drive pawl (130) and spring (138) are retained on main pivot post (134) by, for instance, a C-clip (not shown).

FIGS. 4A through 4I are views illustrating the relationship between and the movement of the control member (72), the release pawl (98) and drive pawl (130) with respect to one another. FIGS. 4A through 4I and the following description further show how the control member (72), the release pawl (98) and drive pawl (130) cooperative with one another to selectively move the cable (28) and hence move the derailleur and chain (D) between a plurality of sprockets in a sprocket set, through engagement of the release pawl (98) and drive pawl (130) with the large and small position retaining teeth (80) and (82) and drive teeth (84).

In the embodiment depicted in FIGS. 4A through 4I there are three large position retaining teeth (80a, 80b and 80c), each of the large position retaining teeth positioned to correspond to one sprocket in a sprocket set having three sprockets, such as the sprocket set shown in FIGS. 5A through 5F, the sprocket set having sprockets (S1, S2 and S3) axially spaced apart as shown. Further, there is at least one small position retaining tooth (82f) formed between the large position retaining teeth (80c) and (80b), at least one small position retaining tooth (82e) formed between the large position retaining teeth (80b) and (80a), and a plurality of small position retaining teeth (82a, 82b, 82c, 82d) formed on a counterclockwise side of the large positioning retaining tooth (80a).

Most of the various positions of the control member (72) with the jaw (104) in engagement with one the large and small position retaining teeth (80) and (82) corresponds to at least one of the positions of a derailleur (200) shown in FIGS. 5A through 5F, as is explained below. Each of FIGS. 5A through 5F show two differing sprocket sets, one sprocket set shown in the upper portion of each of FIGS. 5A–5F and another sprocket set shown in the lower portion of each of FIGS. 5A–5F. The first sprocket set includes sprockets S1, S2 and S3. The second sprocket set includes sprockets S4, S5 and S6. The axial spacing between the sprockets S4, S5 and S6 is larger than the axial spacing between sprockets (S1, S2 and S3).

The operation of the shifting apparatus (10) is described below.

When the bicycle transmission is not in the process of being shifted, an engagement projection (140) of drive pawl (130) engages an abutment (144) shown FIGS. 4A through 4F. The abutment (144) is formed on the retainer plate (76) such that the engagement projection (140) cannot engage any of the drive teeth (84) on the control member (72). When the drive chain is to be shifted to the next largest freewheel sprocket, then main lever (26) is rotated in the counterclockwise direction with respect to FIG. 2. The movement of the main lever (26) causes drive pawl (130) to move from the dotted line representation of the drive pawl (130) in FIGS. 4B–4H and in the direction of the drive pawl (130) shown in solid lines in FIGS. 4B–4H so that engagement projection (140) of drive pawl (130) moves radially inward beyond the abutement (144) and drops into the gap between adjacent drive teeth (84) and (84), until engagement is made with one of the drive teeth (84). Once engagement is made with one of the drive teeth (84), the control member (72) is caused to rotate in a clockwise direction in response to further movement of the drive pawl (130).

The takeup element (52) and control member (72) then rotate in the clockwise direction, with respect to FIGS. 4A–4I. Since release pawl (98) is pivotable about the release pivot post (92), release pawl (98) rotates counterclockwise when one of the large position retaining teeth (80b) or (80a) or one of the small position retaining teeth (82a) through (82f) passes by it as the control member (72) rotates in a clockwise direction, thus allowing contacting position retaining tooth to move to the other side of jaw (104). Thereafter, when main lever (26) is release, spring (118) causes main lever (26) to return to the position shown in FIG. 2, and drive pawl (130) retracts to the position shown in FIG. 4A in solid lines and in dotted lines in FIGS. 4B–4H. Since takeup element (52) and control member (72) are biased in the counterclockwise direction by spring (60), engagement jaw (104) and any of the large or small positional retaining teeth prevents the control member (72) from rotating in a counterclockwise direction, thus maintaining takeup element (52) and the derailleur (200) in the desired position.

When the chain is to be shifted, for instance, to a smaller sprocket, release lever (34) is rotated in a clockwise direction, with respect to FIG. 2. The movement of the release lever (34) causes rotation of the pawl (98) in the counterclockwise direction, with respect to FIGS. 4A–4I. Small amounts of rotation of the pawl (98) will retract the jaw (104) from engagement with any of the small teeth (84), and allow the control member (72) to rotate in a counterclockwise direction but will cause the jaw (104) to engage the first large position retaining teeth (880a, 80b or 80c) that approaches the jaw (104). Large movement of the pawl (98), such as that depicted in FIG. 4I, will bring the jaw (106) into position for contact with the first of either large position retaining teeth (80b) or (80c) that approaches the jaw (106), thus causing a downshift movement of the derailleur (200) from one larger sprocket to the next smaller sprocket. Thereafter, release of the release lever (34) will cause the biased pawl (98) to pivot such that the jaw (104) will engage the nearest large positioning tooth on a clockwise side of the jaw (104). Since engagement projection (140) of drive pawl (130) is resting on abutment (144), drive pawl (130) does not interfere with rotation of control member (72) during downshifting.

Figure 4A:
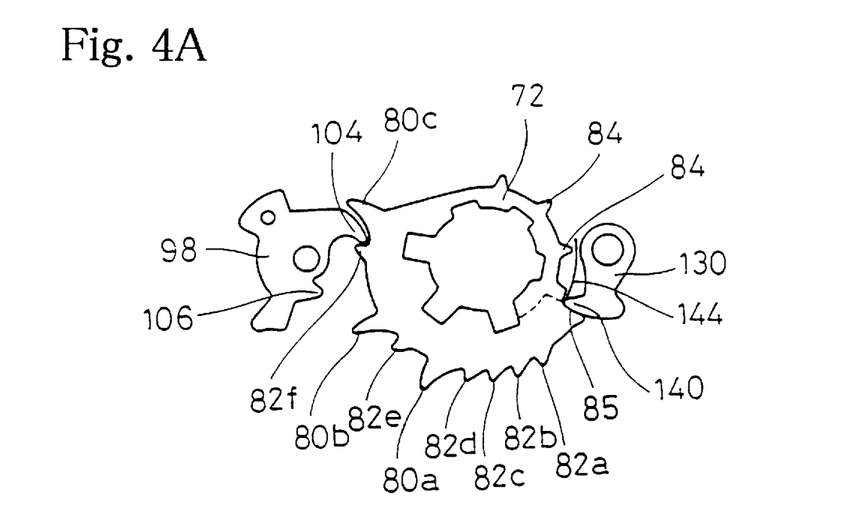
FIGS. 4A–4I are views illustrating various positions of the release pawl, the drive pawl and the control member of the shifting apparatus depicted in FIG. 3, the release pawl, the drive pawl and the control member shown removed from the shifting apparatus for clarity.
Figure 4B:
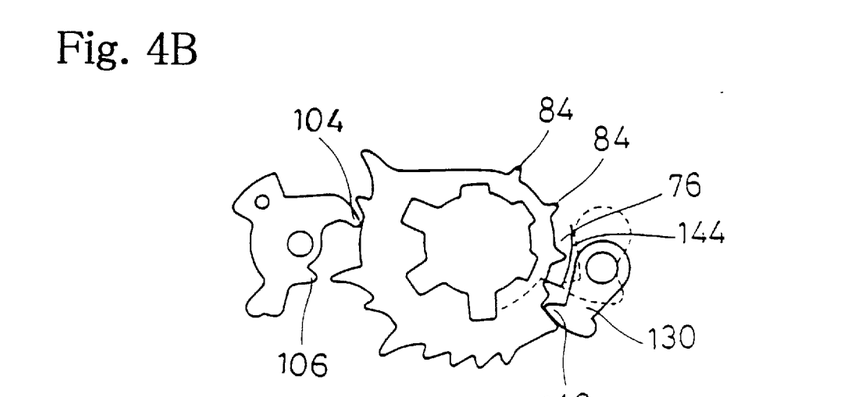
Figure 4C:
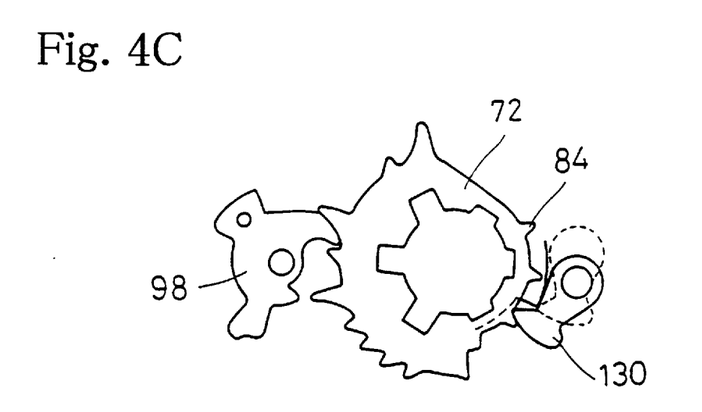
Figure 4D:
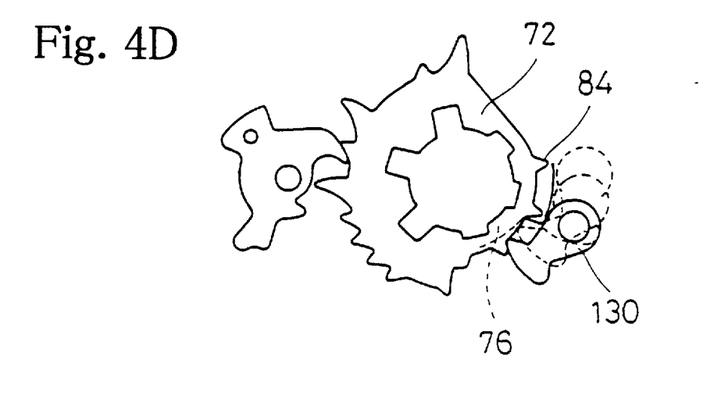
Figure 4E:
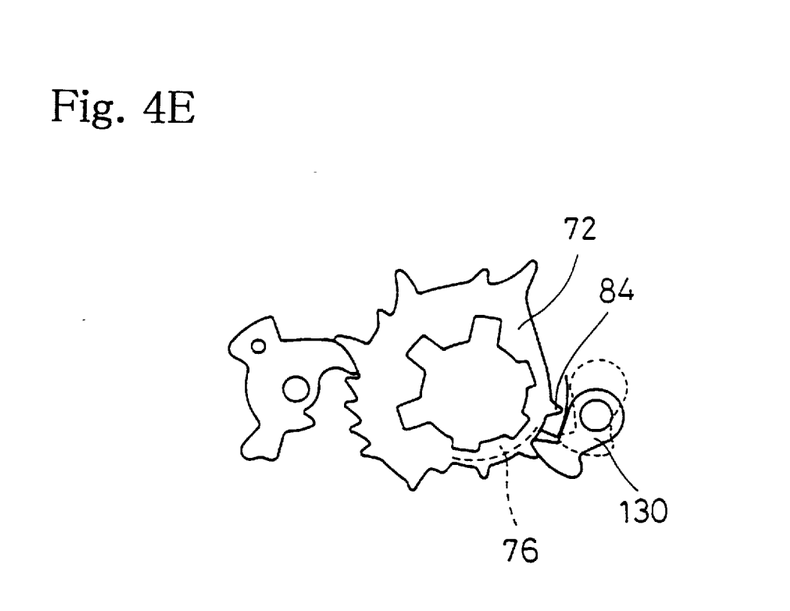
Figure 4F:
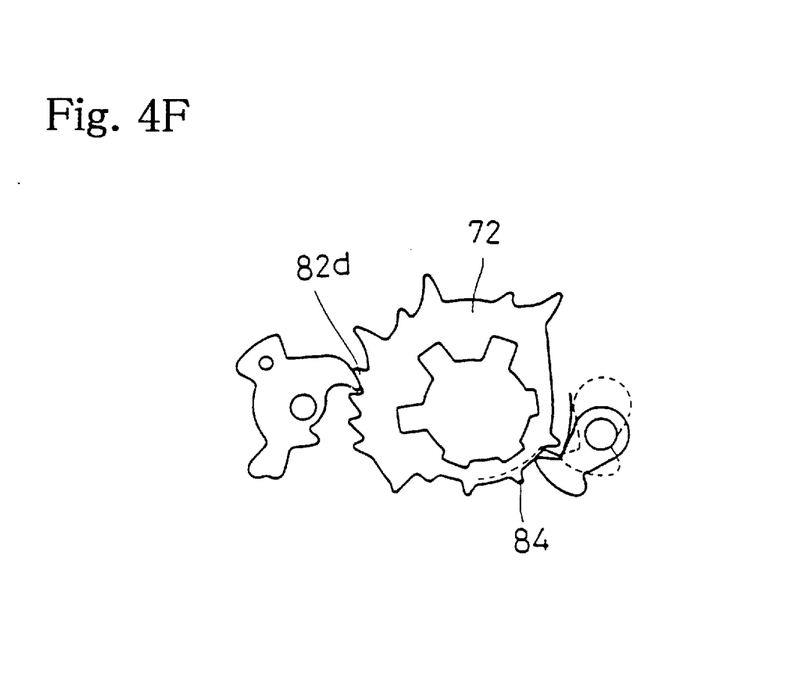
Figure 4G:
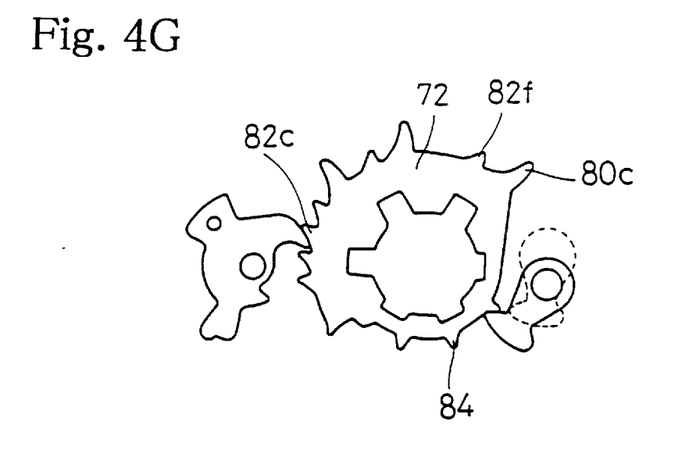
Figure 4H:
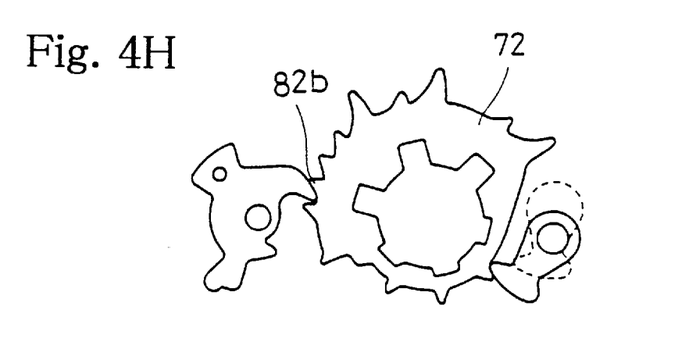
Figure 4I:
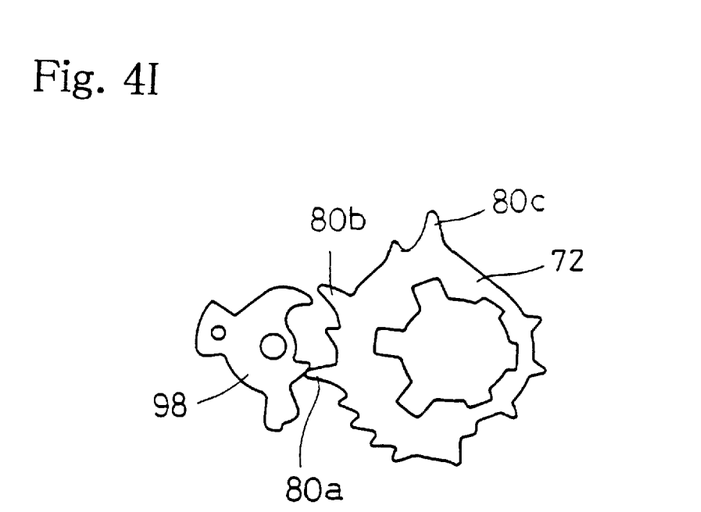
Figure 5A:
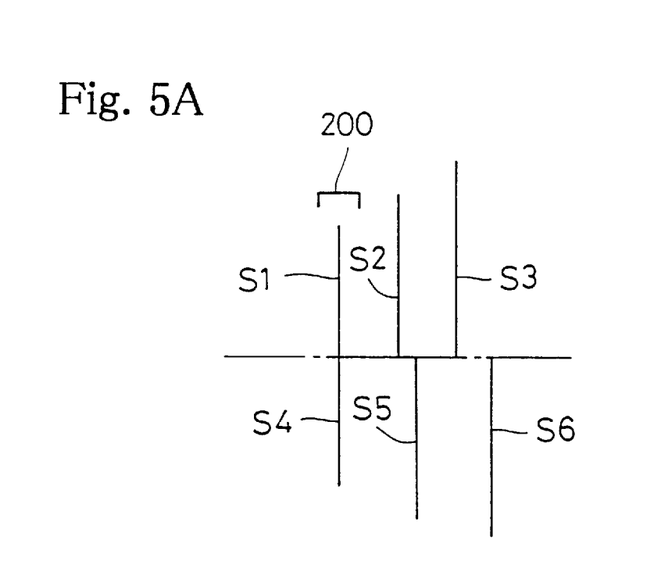
Figure 5B:
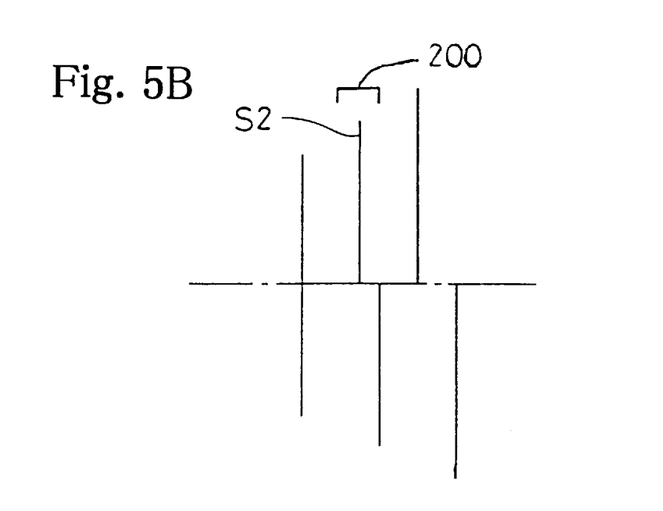

For example, if the release lever (34) has been completely depressed (a large movement) with the control member (72) in the position shown in FIG. 4C where the derailleur is aligned with the sprocket (S2) as shown in FIG. 5B, the subsequent movement of the pawl (98) and control member (72) will cause the jaw (104) disengage the large position retaining tooth (80b), as shown in FIG. 4I. Thereafter, the jaw (106) will make contact with the large position retaining tooth (80b). When release lever (34) is released, spring (94) causes release lever (34) to rotate back to the position shown in FIG. 1. Since release pawl (98) is biased in the clockwise direction by spring (102), release pawl (98) will rotate in the clockwise direction, and jaw (106) moves up the side of position retaining tooth (80b) until the tip of jaw (106) clears the tip of position retaining tooth (80b). When this occurs, control member (72), which is biased in the counterclockwise direction by spring (60), moves counterclockwise until position retaining tooth (80c) abuts against jaw (104) as shown in FIG. 4A, thus completing the downshifting operation.

Figure 5C:
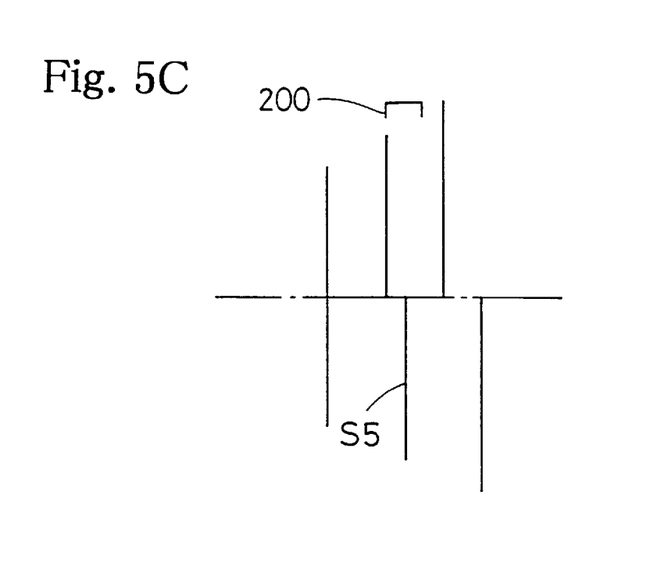
Figure 5D:
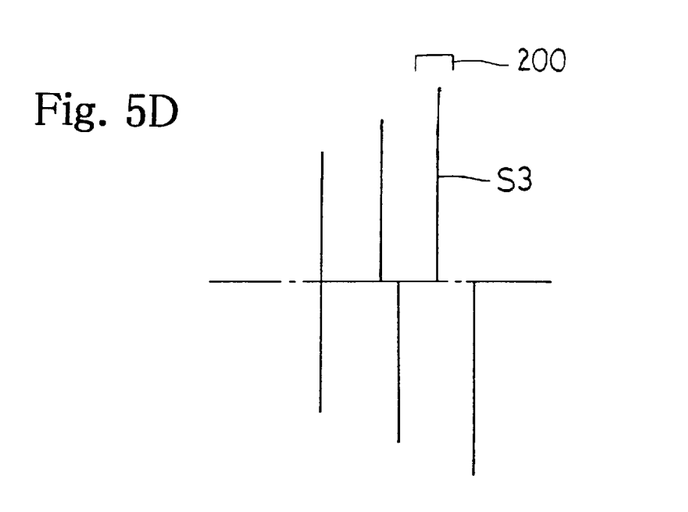
Figure 5E:
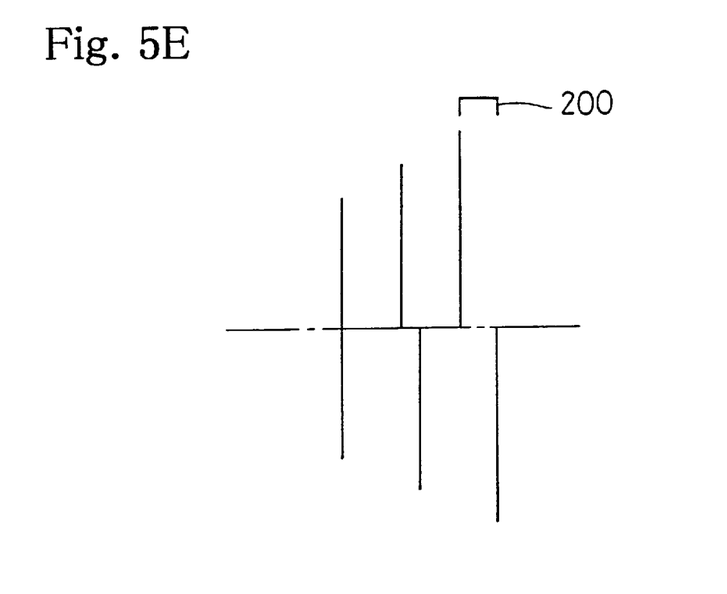
Figure 5F:
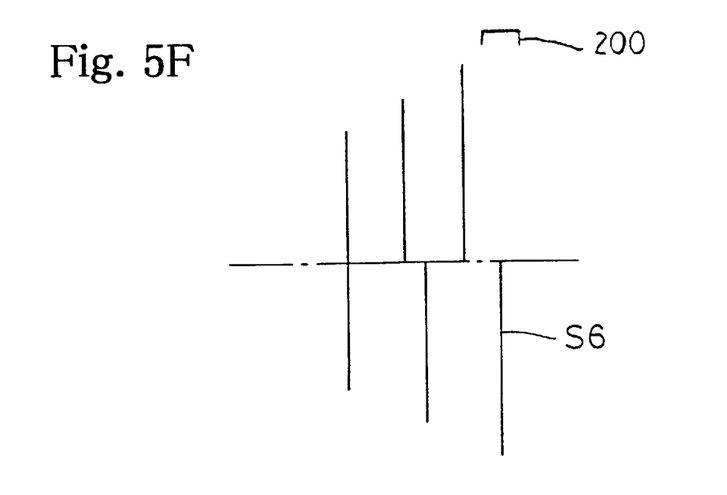

With respect to FIGS. 4A through 4I, the drive chain (D) is engaged with the smallest freewheel sprocket (S1) or (S4) in either sprocket set when the position retaining tooth (80c) abuts against jaw (104) of release pawl (98), as shown in FIG. 5A. The drive chain (D) is engaged with the freewheel sprocket (S2) when the position retaining tooth (80b) abuts against jaw (104) of release pawl (98), as shown in FIG. 5B. However, the drive chain (D) is engaged with the freewheel sprocket (S5) when the position retaining tooth (82e) abuts against jaw (104) of release pawl (98), as shown in FIG. 5C, and so on. The positions of the chain derailleur (200) shown in FIGS. 5A through 5F correspond to the positions of the control member (72) depicted in FIGS. 4A through 4I as follows:

1) the position of the derailleur (200) in FIG. 5A corresponding to the position of the control member (72) depicted in FIG. 4A,
2) the position of the derailleur (200) in FIG. 5B corresponding to the position of the control member (72) depicted in FIG. 4C,
3) the position of the derailleur (200) in FIG. 5C corresponding to the position of the control member (72) depicted in FIG. 4D,
4) the position of the derailleur (200) in FIG. 5D corresponding to the position of the control member (72) depicted in FIG. 4E, 5) the position of the derailleur (200) in FIG. 5E corresponding to the position of the control member (72) depicted in FIG. 4F, and
6) the position of the derailleur (200) in FIG. 5F corresponding to the position of the control member (72) depicted in FIG. 4G.

However, it should be understood that the dimensional relationship or axial spacing between the sprockets S1, S2 and S3 and the sprockets S4, S5 and S6 are for example only. Other spacings, number of sprockets and the correspondence between position retaining teeth and sprockets may be varied or altered depending upon design requirements.

In the manner described above, the present invention allows for shifting from a small sprockets such as the sprocket (S1) stepwise to a larger sprocket (S2) with simple motion of the lever (26) using indexing provided by the large position retaining teeth (80c, 80b and 80c). Further, in the event that the shifting mechanism is used with a sprocket set such as the sprocket set having sprockets (S4, S5 and S6) having large axial spacing between the sprockets, the small position retaining teeth (82a–82f) provide additional accurate indexing. For downshifting, the shape of the pawl (98) and the size of the jaws (104) and (106) are such that upon downshifting, movement of the control member (72) will be stepwise between adjacent large position retaining teeth (80a, 80b, 80c) since upon movement of the lever (34) the jaws (104) and (106) will only engage the large position retaining teeth (80a, 80b or 80c) one at a time. Therefore, for upshifting to a larger sprocket, the present invention allows for both large and small positional changes of the control member (72) in accordance with the movement of the drive pawl (130) and the spacing between both large and small position retaining teeth. But for downshifting, the present invention only allows large movements of the control member (72) between adjacent large position retaining teeth (80a, 80b and 80c) for rapid downshifting often required by bicycle riders.

When a bicycle derailleur mechanism is shifted, the amount of displacement of the derailleur may vary depending upon the size requirements of the chain sprockets employed. In a derailleur/freewheel configuration, this is caused in part by the variable distance between successive freewheel gears. In an indexed shifting apparatus, this variable displacement is accommodated by setting the position retaining teeth at different spacing from each other to correspond to the spacing between the sprockets in a sprocket set. However, because various types of sprocket sets are employed currently for front derailleurs, the present invention is necessary for use with a variety of sprockets sets. With the sprocket set shown in the upper half of each of FIGS. 5A through 5F, the large position retaining teeth provide accurate positioning of the derailleur (200). Further, in the same shifting apparatus, may be used with the sprocket set shown in the lower half of each of FIGS. 5A through 5F without modification or alteration.

Figure 6:
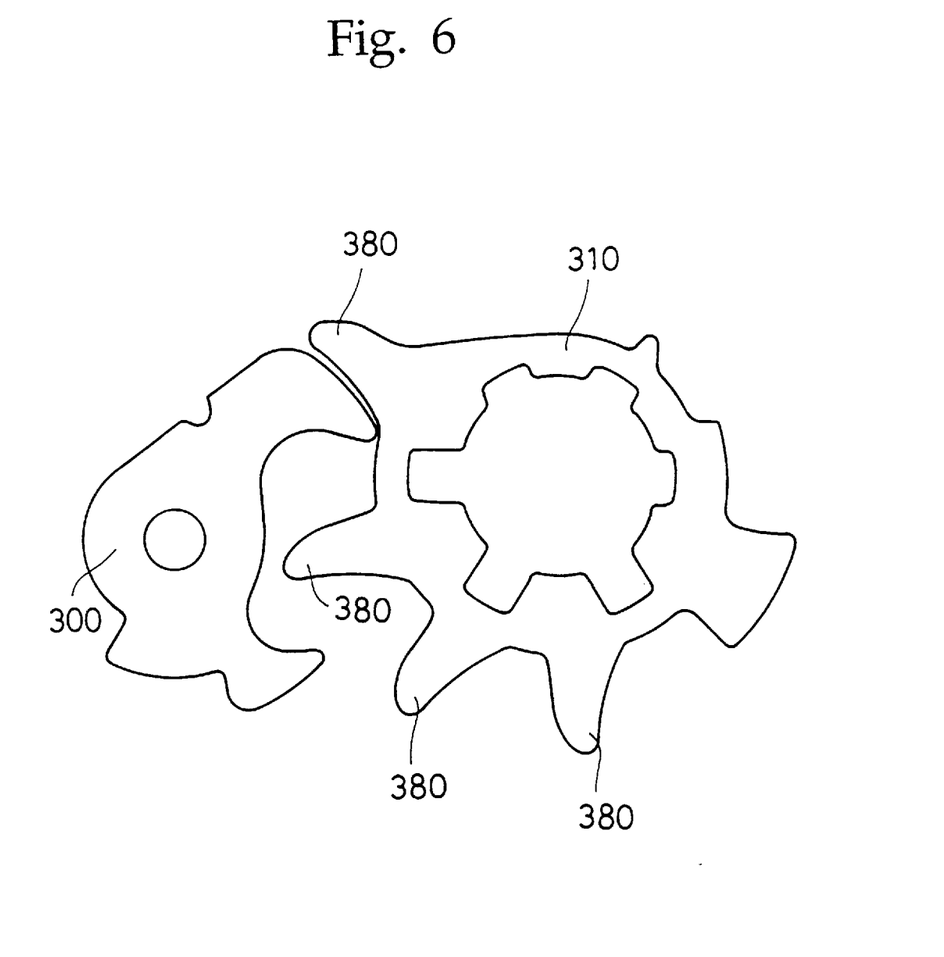
FIG. 6 is an elevational view of a prior art release pawl and corresponding prior art control member that are configured for use with a single sprocket set.
Figure 7:
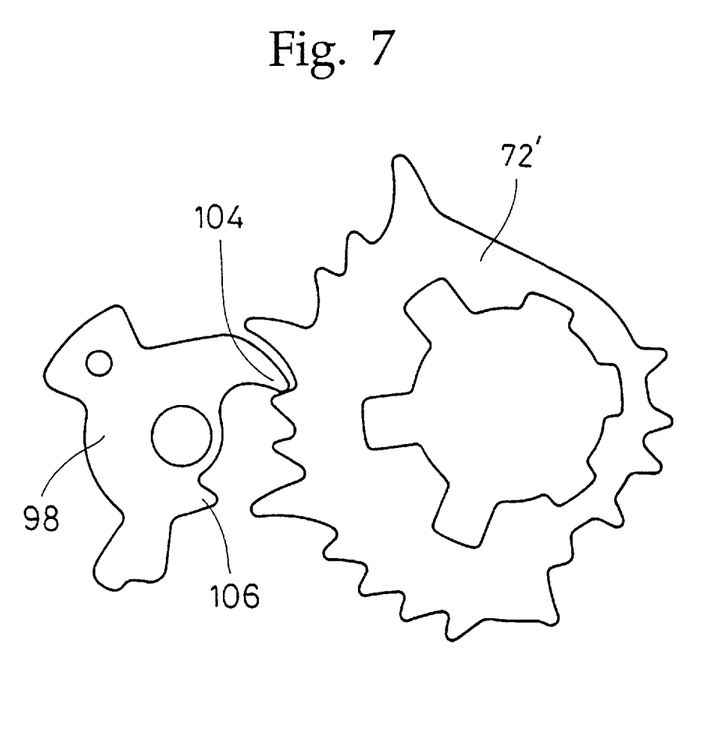
FIG. 7 is an elevational view similar to FIG. 6, showing a release pawl and corresponding control member in accordance with an alternate embodiment of the present invention, the release pawl and control member being configured for use with multiple sprocket sets.

To further illustrate the present invention, and to show an alternate embodiment, FIGS. 6 and 7 are provided to demonstrate the differences between the present invention and the prior art. FIG. 6 shows a release pawl (300) and a control member (310) from a prior art shifting apparatus. There are four position retaining teeth (380) formed on the control member (310). The first three position retaining teeth (380) correspond generally to three sprockets of a sprocket set. The control member (310) may only be reliably used with a sprocket set whose sprockets are spaced apart in harmony with the spacing of the position retaining teeth (380). No other sprocket set may be reliably be used with the control member (310).

In FIG. 7, on the other hand, an alternate embodiment of the present invention is shown where a control member (72') is shown with a plurality of large position retaining teeth, a plurality of small positioning teeth and plurality of drive teeth. In a manner similar to the above described embodiment of the present invention, the control member (72') may be used with a variety of sprockets sets having various axial spacings between sprockets. The large position retaining teeth may correspond to a popular sprocket set employed on a large number of bicycles, while the small position retaining teeth may correspond generally to a variety of differing sprocket sets where those sprocket sets have axial spacing between sprockets that differs from the popular sprockets set.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. An apparatus for shifting positions of a bicycle derailleur mechanism comprising:

a shifting mechanism for selectively moving the bicycle derailleur mechanism between a plurality of positions corresponding to positions of sprockets of a plurality of differing sprocket sets;

a control member mounted for selective rotational movement within said shifting mechanism, said control member being formed with a plurality of large position retaining teeth and a plurality of small position retaining teeth, at least one of said small position retaining teeth formed between each adjacent ones of said large position retaining teeth, each of said large position retaining teeth being positioned on said control member to correspond to the positions of the sprockets in a first of the plurality of differing sprocket sets, and at least one of said small position retaining teeth corresponding to the position of one sprocket in a second of the plurality of differing sprocket sets, wherein positioning of said control member is effected by pawl members including a drive pawl that is configured to selectively move said control member in a first rotary direction, and a release pawl, said release pawl being formed with a large jaw and a small jaw, said large jaw being spaced apart from said small jaw, said large jaw being configured to engage said small position retaining teeth and said large position retaining teeth in response to rotation of said control member, said small jaw being configured to engage only said large position retaining teeth in response to rotation of said control member.

2. A bicycle transmission shifting apparatus comprising:

a fixed member;

a takeup element rotatably supported on the fixed member for alternately rotating in a transmission element winding direction and in a transmission element unwinding direction, the takeup element being biased in the transmission element unwinding direction;

a first control member for engaging the takeup element through a one-way transmission unit rotating the takeup element in the transmission element winding direction;

a position retaining unit coupled to the takeup element and being switchable between a position retaining state for retaining the takeup element in a selected position and a position releasing state for allowing the takeup element to rotate in the transmission element unwinding direction, the position retaining unit including only a single position retaining pawl coupled to the takeup element; and a second control member for engaging the position retaining unit for switching the position retaining unit between the position retaining state and the position releasing state; wherein said position retaining unit further comprises a control wheel mounted for selective rotational movement within said position retaining unit, said control wheel being formed with a plurality large position retaining teeth and a plurality of small position retaining teeth, at least one of said small position retaining teeth formed between each adjacent ones of said large position retaining teeth, each of said large position retaining teeth being positioned on said control wheel to correspond to the positions of sprockets in a first of a plurality of differing sprocket sets, and at least one of said small position retaining teeth corresponding to the positions of sprockets in a second of the plurality of differing sprocket sets, wherein positioning of said control wheel is effected by a drive pawl that is configured to selectively move said control wheel in a first rotary direction, and said position retaining pawl, said position retaining pawl being formed with a large jaw and a small jaw, said large jaw being spaced apart from said small jaw, said large jaw being configured to engage said small position retaining teeth and said large position retaining teeth in response to rotation of said control wheel, said small jaw being configured to engage only said large position retaining teeth in response to rotation of said control wheel.

3. An apparatus for shifting positions of a bicycle derailleur mechanism comprising:

a shifting mechanism for selectively moving the bicycle derailleur mechanism between a plurality of positions corresponding to positions of sprockets of a plurality of differing sprockets sets;

a control member mounted for selective rotational movement within said shifting mechanism, said control member being formed with a plurality of large position retaining teeth and a plurality of small position retaining teeth, at least one of said small position retaining teeth formed between each adjacent ones of said large position retaining teeth, each of said large position retaining teeth being positioned on said control member to correspond to the positions of the sprockets in a first of the plurality of differing sprocket sets, and at least one of said small position retaining teeth corresponding to the position of one sprocket in a second of the plurality of differing sprockets sets, and said control member being spring biased for rotation in a first direction;

a release pawl mounted in said shifting mechanism, said release pawl being biased into engagement with said control member, said release pawl having a first jaw and a second jaw, said first jaw configured to engage said large and small position retaining teeth preventing rotation of said control member in said first direction, said second jaw being configured to engage only said large position retaining teeth;

an upshifting lever connected to said shifting mechanism, wherein said shifting mechanism is configured to rotate said control member in a second direction opposite said first direction in response to movement of said upshifting lever; and a downshifting lever configured to move said first jaw of said release pawl away from engagement with said control member and simultaneously move said second jaw toward said control member for engagement only with said large position retaining teeth thus allowing said control member to rotate in said first direction in accordance with position of said large position retaining teeth with respect to said second jaw.

* * * * *